(12) United States Patent
Kim (10) Patent No.: US 10,812,127 B2
(45) Date of Patent: Oct. 20, 2020

(54) PORTABLE TERMINAL CASE

(71) Applicant: ITVERS CO., LTD., Seoul (KR)

(72) Inventor: Youn Soo Kim, Seoul (KR)

(73) Assignee: ITVERS CO., LTD., Seoul (KR)

( * ) Notice: Subject to any disclaimer, the term of this patent is extended or adjusted under 35 U.S.C. 154(b) by 148 days.

(21) Appl. No.: 15/551,355

(22) PCT Filed: Feb. 15, 2016

(86) PCT No.: PCT/KR2016/001467
§ 371 (c)(1),
(2) Date: Aug. 16, 2017

(87) PCT Pub. No.: WO2016/133315
PCT Pub. Date: Aug. 25, 2016

(65) Prior Publication Data
US 2018/0034495 A1    Feb. 1, 2018

(30) Foreign Application Priority Data

Feb. 16, 2015  (KR) .......................... 10-2015-0023214

(51) Int. Cl.
*H04B 1/3888*  (2015.01)
*A45C 11/00*   (2006.01)
*A45C 13/00*   (2006.01)

(52) U.S. Cl.
CPC ............ *H04B 1/3888* (2013.01); *A45C 11/00* (2013.01); *A45C 13/00* (2013.01); *A45C 2011/002* (2013.01); *A45C 2011/003* (2013.01)

(58) Field of Classification Search
USPC ....................................................... 455/550.1
See application file for complete search history.

(56) References Cited

U.S. PATENT DOCUMENTS

| | | | | |
|---|---|---|---|---|
| 2014/0028614 A1* | 1/2014 | Bae | ......................... | G06F 3/044 345/174 |
| 2014/0110231 A1* | 4/2014 | Kibiti | ..................... | H01H 15/04 200/293 |
| 2014/0225821 A1* | 8/2014 | Kim | ....................... | H04M 1/236 345/156 |
| 2014/0333831 A1* | 11/2014 | Oh | ....................... | H04N 5/2254 348/376 |

(Continued)

FOREIGN PATENT DOCUMENTS

| KR | 1020090111541 | 10/2009 |
|---|---|---|
| KR | 200464126 | 12/2012 |

(Continued)

OTHER PUBLICATIONS

International Preliminary Report on Patentability and Written Opinion issued in International Patent Application No. PCT/KR2016/001467, dated Aug. 22, 2017.

(Continued)

*Primary Examiner* — Ganiyu A Hanidu
(74) *Attorney, Agent, or Firm* — Norton Rose Fulbright US LLP (57) ABSTRACT

A portable terminal case according to one embodiment of the present invention accommodates a portable terminal, and comprises an input button mounted on the portable terminal case, wherein the input button generates an input signal of the portable terminal.

19 Claims, 11 Drawing Sheets

(56) References Cited

U.S. PATENT DOCUMENTS

2014/0347330 A1* 11/2014 Kim ................... G06F 1/1637
                                                                         345/184

FOREIGN PATENT DOCUMENTS

| KR | 2020130002421 | 4/2013 |
|----|---------------|--------|
| KR | 1020140113853 | 9/2014 |
| KR | 101446570 | 10/2014 |
| KR | 1020140120013 | 10/2014 |

OTHER PUBLICATIONS

International Search Report issued in International Patent Application No. PCT/KR2016/001467 dated Jun. 16, 2016.

* cited by examiner

PORTABLE TERMINAL CASE

CROSS REFERENCE TO RELATED APPLICATIONS

This application is a national phase application under 35 U.S.C. § 371 of International Application No. PCT/KR2016/001467, filed Feb. 15, 2016, which claims priority to Korean Application No. 10-2015-0023214, filed Feb. 16, 2015. The contents of the referenced applications a incorporated in the present application by reference.

FIELD OF THE DISCLOSURE

The present invention relates to a portable terminal case, and more specifically, to a portable terminal case including an input button configured to generate an input signal of a portable terminal.

DESCRIPTION OF RELATED ART

Recently, many portable terminals, such as smartphones, have been released. In the case of such portable terminals, protective cases are used while being installed on the portable terminals to protect exposed liquid crystal display. Mobile phone protective cases of such portable terminals may have a shape which surrounds side and rear surfaces of mobile phones and may also include covers which cover liquid crystal display to protect the liquid crystal display.

Meanwhile, in the case of conventional smartphones, although small liquid crystal displays were used so that the mobile phones were easy to carry and faithful to the original function of communication, according to current trends, users prefer obtaining more information from a wide screen over portability, and thus there is an increasing trend toward smartphones including large liquid crystal displays.

However, although the increase in size of the smartphone can satisfy a user's visual comfort, there is a problem in that the smartphone becomes difficult to control with one hand.

A technology which relates to a mobile phone protective case is disclosed in Korean Patent Laid-Open Publication No. 10-2014-0120013, and the technology specifically relates to a mobile phone protective case which includes a case which surrounds lower and side surfaces of a mobile phone to be protected and a cover connected to one side surface of the case, configured to cover an upper surface of the cellular phone, and having a flat panel shape, and a flexible printed circuit board (FPCB) on which at least one light emitting device is mounted and which is disposed inside the cover, wherein the light emitting device operates when the mobile phone receives a call, however, the technology does not include the technical gist of the present invention.

SUMMARY OF THE INVENTION

A portable terminal case according to the present invention is directed to providing a solution to solve the above-described problem.

The present invention is directed to a portable terminal case formed such that a user may easily and freely operate a portable terminal with one hand even though the portable terminal includes a large display.

The object to be solved by the present invention is not limited to the above-described objects, and other unmentioned objects may be clearly understood by those skilled in the art from the following descriptions.

One aspect of the present invention provides a portable terminal case configured to accommodate a portable terminal including: an input button mounted on the portable case, wherein the input button generates an input signal of the portable terminal.

The input button may include: a housing having an inner space; a push button seated in the inner space; a sensor formed on one surface of an outer side surface of the push button and an inner side surface of the housing; and a contact point formed on the other surface of the outer side surface of the push button and the inner side surface of the housing, wherein, when the push button is moved in a lateral direction, the sensor and the contact point may come into contact with each other and the input signal of the portable terminal may be generated.

the input button may include: a base member including a bottom surface and a protrusion protruding upward from the bottom surface; a push button located above the protrusion and including a downward sidewall formed to surround the protrusion; a sensor formed on one surface of an outer side surface of the protrusion and an inner side surface of the downward sidewall; and a contact point formed on the other surface of the outer side surface of the protrusion and the inner side surface of the downward sidewall, wherein, when the push button is moved in a lateral direction, the sensor and the contact point may come into contact with each other and the input signal of the portable terminal may be generated.

A press button may be disposed on an upper surface of the push button.

A mouse pointing signal or a direction key signal may be generated when the push button is pushed in the lateral direction, a click signal may be generated when the press button is pressed, and a scroll signal or a drag signal may be generated when the push button is pushed while the press button is being pressed.

When a predetermined time has elapsed after the push button is pushed while the press button is being pressed and the push button is pushed again after the press button and the push button are released, generation of the scroll signal or the drag signal may continue and not stop.

When the press button is pressed and released after the scroll signal or the drag signal is continuously generated, the generation of the scroll signal or the drag signal may stop.

A click signal may be generated when the press button is pressed for a time less than a predetermined time, and a scroll or drag signal may be generated when the press button is pressed for a time greater than or equal to the predetermined time.

The portable terminal case may further include a controller configured to control driving of the input button and a battery configured to supply power to at least one of the input button and the controller.

The controller may further include a communication part for wireless communication between the portable terminal and the input button.

The battery may further include a wirelessly recharging function.

The portable terminal case may further includes a cover part formed to extend from one side surface of the portable terminal case and formed to cover a display part of the portable terminal.

An open region may be formed in one part of the cover part, and when the cover part is pivoted backward and the open region is disposed at a rear surface of the portable terminal, the input button may be exposed to the outside.

An open portion may be formed in one part of a contact portion of the cover part and a side surface of the portable terminal.

The input button may be disposed in a region in the portable terminal case corresponding to a rear surface of the portable terminal.

The input button may be disposed in a region in the portable terminal case corresponding to a side surface of the portable terminal.

The input button may be disposed in a region in the portable terminal case corresponding to a lower side of a front surface of the portable terminal.

The portable terminal case may further include a button part having at least one function button configured to perform a specific function of the portable terminal.

The button part may be disposed in a region in the portable terminal case corresponding to a rear surface of the portable terminal.

The button part may be is disposed in a region in the portable terminal case corresponding to a side surface of the portable terminal.

The button part may include a home button or a back button.

The specific function of the function button may be settable using an application installed in the portable terminal by a user.

The application may be settable such that an additional control of the specific function performed by the function button is performed by the input button.

Another aspect of the present invention provides a portable terminal case including: a first case configured to directly accommodate a portable terminal; a second case configured to accommodate the first case or coupled to the first case; and an input button mounted on the second case, wherein the input button generates an input signal of the portable terminal.

Since a portable terminal case according to the present invention includes an input button formed in a portable case and configured to generate an input signal of a portable terminal, a user can simultaneously support the portable terminal with one hand and control the portable terminal by using the input button, and thus there is an effect of improving ease of use of a user's portable terminal.

In addition, since an input button is formed such that various signals can be generated by combinations of a push button and a press button, there is an effect of providing a portable terminal case having reduced costs thereof and capable of overcoming a height limitation of a portable terminal.

Effects of the present invention are not limited to the above-described effects, and other unmentioned effects can be clearly understood by those skilled in the art from the following descriptions.

DETAILED DESCRIPTION OF THE INVENTION

Exemplary embodiments of the present invention will be described in detail with reference to the accompanying drawings, and components that are the same or similar to each other regardless of reference numerals will be referred to by the same reference numeral, and redundant descriptions thereof will be omitted.

In addition, in the description of the present invention, when detailed descriptions of related known technology are deemed to obscure the gist of the present invention, the detailed descriptions will be omitted. In addition, the accompanying drawings are only for an easy understanding of the spirit of the present invention, and the scope of the present invention is not to be interpreted as limited by the accompanying drawings.

Figure 1:
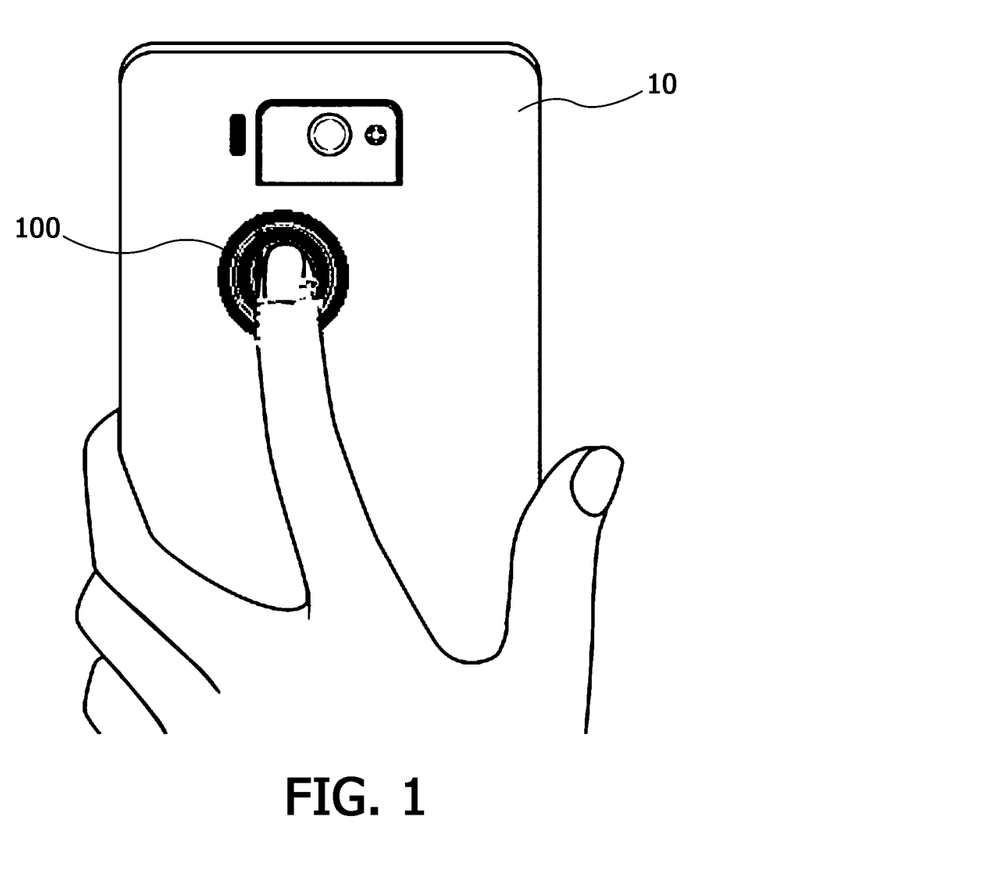
FIG. 1 is a conceptual view for describing a usage example of a portable terminal case according to the present invention.

Hereinafter, a portable terminal case according to the present invention will be described with reference to FIGS. 1 to 3. FIG. 1 is a conceptual view for describing a usage example of the portable terminal case according to the present invention, FIG. 2 is a view illustrating a front surface of the portable terminal case according to one embodiment of the present invention, and FIG. 3 is a view illustrating a rear surface of the portable terminal case according to one embodiment of the present invention.

As illustrated in FIG. 1, a portable terminal case 10 according to the present invention is configured to accommodate a portable terminal, and an input button 100 is mounted on the portable terminal case 10. The input button 100 generates an input signal of the portable terminal accommodated in the portable terminal case 10. Accordingly, a user may easily control a portable terminal, on which a large touch input screen is installed, with one hand by operating the input button 100 while supporting the portable terminal case 10 with the one hand.

Figure 2:
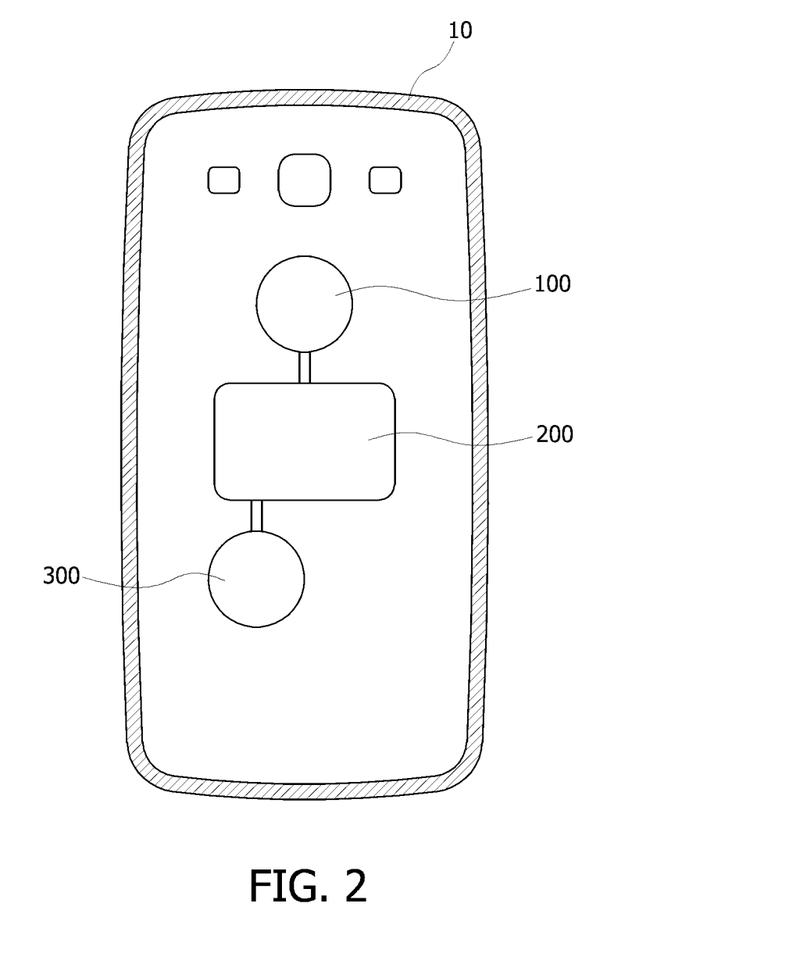
FIG. 2 is a view illustrating a front surface of the portable terminal case according to one embodiment of the present invention.
Figure 3:
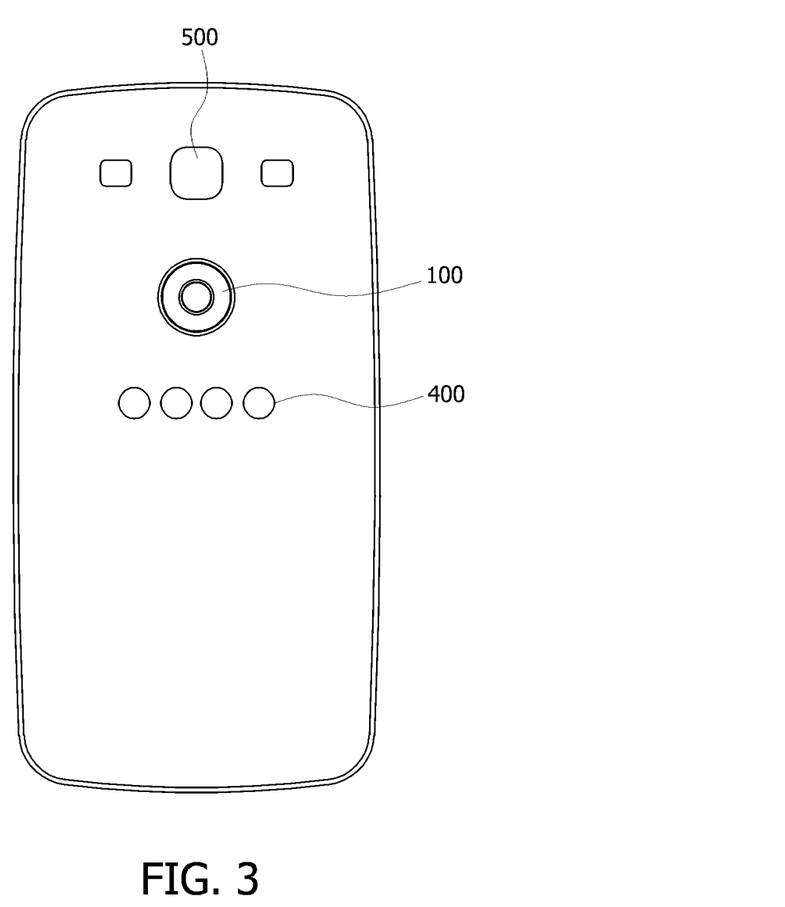
FIG. 3 is a view illustrating a rear surface of the portable terminal case according to one embodiment of the present invention.

In addition, as illustrated in FIG. 2, the portable terminal case 10 according to the present invention includes a controller 200 and a battery 300 in addition to the input button 100.

The controller 200 is configured to control driving of the input button 100, and specifically, performs a function of processing a signal generated according to an operation of the input button 100, and the controller 200 includes a communication part accommodated in the portable terminal case 10 and configured to communicate with the portable terminal case 10. It is preferable for transmission and reception of signals between the portable terminal and the portable terminal case 10 to be performed through wireless communication, such as Bluetooth, such that an additional communication method is not needed between the portable terminal and the portable terminal case 10.

The battery 300 is configured to supply power to at least one of the input button 100 and the controller 200, and it is preferable for the battery 300 to employ a coin-shaped lithium or mercury battery in consideration of a thickness of the portable terminal case 10. In addition, the battery 300 may also be formed to be wirelessly rechargeable.

Meanwhile, it is preferable for the input button 100, the controller 200, and the battery 300 to be connected via a flexible printed circuit board (FPCB) to be electrically connected to each other, and although the input button 100, the controller 200, and the battery 300 are illustrated in an exposed state in FIG. 2, it is preferable for the portable terminal case 10 to be formed such that the input button 100, the controller 200, and the battery 300 are not exposed to the outside to prevent the input button 100, the controller 200, and the battery 300 from escaping from the portable terminal case 10 or breaking while the portable terminal is attached to or detached from the portable terminal case 10.

In addition, as illustrated in FIG. 3, the portable terminal case 10 according to the present invention may include a hollow 500 for exposing a camera lens, a light emitting diode, and the like attached to the portable terminal to the outside in addition to the above-described parts, and may include a button part 400 having at least one function button configured to perform a specific function of the portable terminal. For example, the function button may be set to serve as a home button or a back button of the portable terminal, or may be set as a play button, a previous track button, a next track button, a stop button, or the like when the portable terminal drives a music playing application. Meanwhile, a specific function of the function button may be set according to an application installed in the portable terminal, and a necessary specific function of a user may be set for each function button after a dedicated application of the portable terminal case 10 according to the present invention is installed in the portable terminal. For example, the function button may be set to perform a hot key function for a specific application, and the specific function of the application performed by the function button may be set to be controllable through the input button 100.

Figure 4:
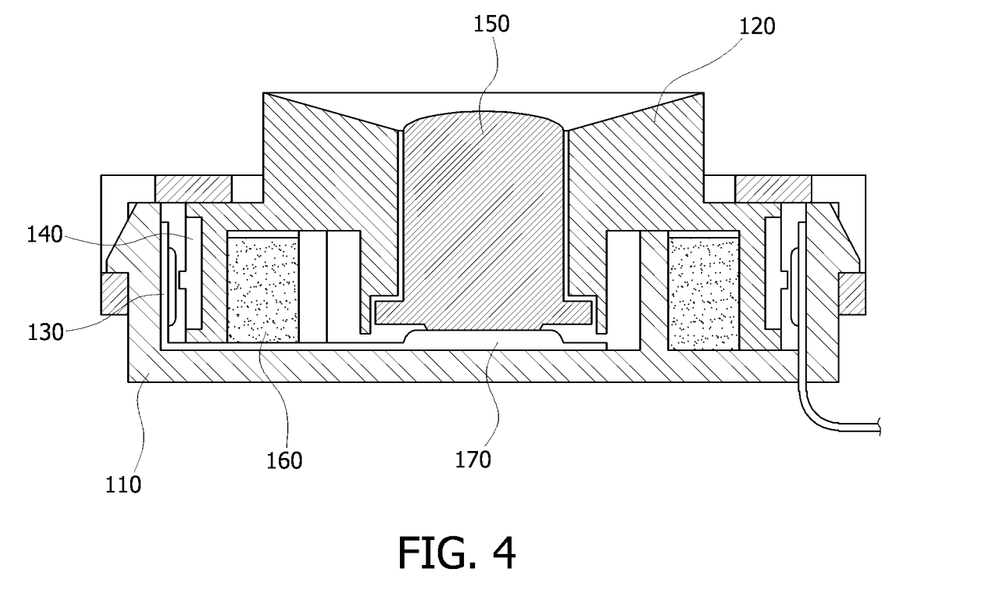
FIG. 4 is a view illustrating an example of an input button applied to the portable terminal case according to the present invention.
Figure 5:
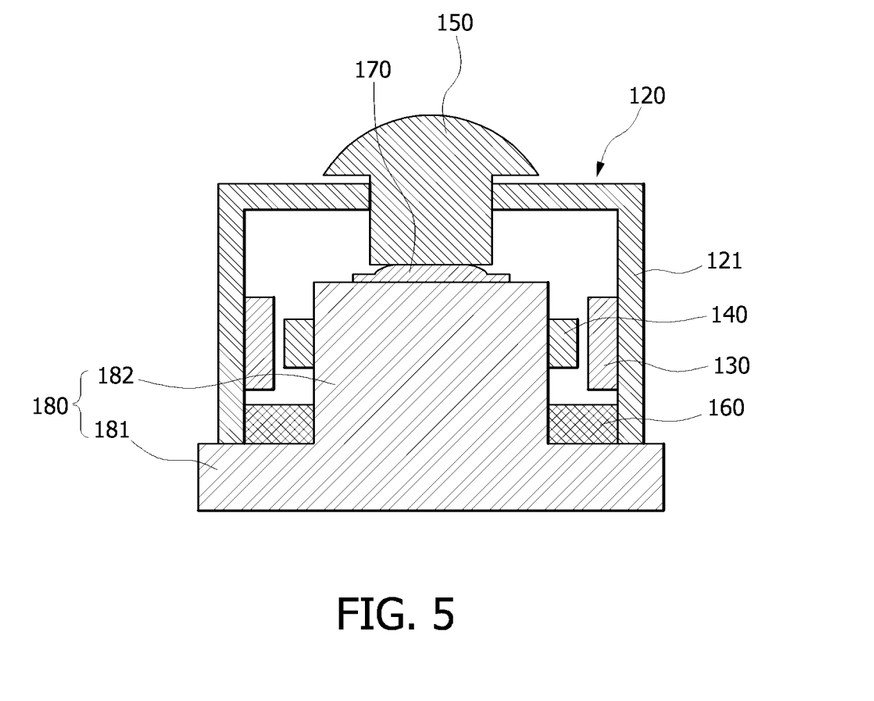
FIG. 5 is a view illustrating another example of an input button applied to the portable terminal case according to the present invention.

As described above, the parts of the portable terminal case 10 according to the present invention have been described on the basis of functions thereof, and hereinafter, the input button 100 included in the portable terminal case 10 according to the present invention will be specifically described with reference to FIGS. 4 and 5. FIG. 4 is a view illustrating an example of an input button applied to the portable terminal case according to the present invention, and FIG. 5 is a view illustrating another example of an input button applied to the portable terminal case according to the present invention.

First, one example of the input button 100 applied to the portable terminal case 10 according to the present invention will be described with reference to FIG. 4. The input button 100 applied to the portable terminal case 10 according to the present invention mainly includes a housing 110, a push button 120, a sensor 130, and a contact point 140. The housing 110 is formed to have an inner space having an open upper side. The push button 120 is seated in the inner space formed in the housing 110, and is not fixed in a seated state in the inner space but is laterally movable by a predetermined distance in forward, rearward, leftward, and rightward directions. The sensor 130 is formed on one surface of an outer side surface of the push button 120 or an inner side surface of the housing 110, and the contact point 140 is formed on the other surface of the outer side surface of the push button 120 or the inner side surface of the housing 110. Specifically, such a sensor 130 may be formed with an FPCB including two or more terminal switches, and here, the terminal switches serve as the sensor 130. The contact point 140 is preferably formed of a conductive material, and, when the push button 120 is pushed in a lateral direction, the contact point 140 comes into contact with the sensor 130 located in the direction in which the push button 120 is moved, and thus an input signal allocated to the contacted sensor 130 is ultimately generated.

Although a push type input button configured to generate an input signal by being pushed and pressed in the lateral direction as described above was already disclosed in various structures, since a pressure sensor is necessary in a conventional push type input button for sensing a lateral pressure, the conventional push type input button has a disadvantage in that a manufacturing cost of a signal input device is increased. Particularly, in the case in which the push type input button is formed such that different kinds of input signal are generated according to directions in which the button is pushed, since a pressure sensor has to be installed in each direction in which pressure is applied, there is a disadvantage in that the above-described manufacturing cost problem is further increased.

However, according to one example of the input button 100 applied to the portable terminal case according to the present invention, there is an advantage in what different kinds of input signal are generated according to corresponding lateral directions in which pressures are applied even without a separate pressure sensor in each of the directions.

Meanwhile, after the push button 120 is pushed and moved in one direction and the contact point 140 comes into contact with any one sensor 130, when the pressure applied to the push button 120 is released and a state in which the sensor 130 is in contact with the contact point 140 is maintained, the input signal may be continuously generated against a user's intention. To solve such a problem, it is preferable for the input button 100 to include an elastic member 160 configured to return a position of the push button 120 to an initial position thereof such that the sensor 130 and the contact point 140 may be spaced apart when the push button 120 is moved in the lateral direction. When the elastic member 160 is included in the input button 100 as described above, since the push button 120 is returned to the initial position due to an elastic force of the elastic member 160 when a lateral external force applied to the push button 120 is released, the sensor 130 is in a state of being spaced apart from the contact point 140, that is, no input signal is generated at the state.

In addition, according to one example of the input button 100 applied to the portable terminal case according to the present invention, the input button 100 may further include a switch 170 disposed on a lower end of the housing and a press button 150 disposed at an upper surface of the push button 120, as illustrated in FIG. 4. The press button 150 passes through the push button 120 in an upward direction and is exposed to the outside, a lower end of the press button 150 is seated on the switch 170, the press button 150 is pushed downward to press the switch 170 when a downward pressure is applied to the press button 150, and thus an additional signal, which is not a signal generated by a movement of the push button 120, may be generated. Accordingly, various signals may be generated on the basis of combinations of operations of the push button 120 and the press button 150.

Hereinafter, another example of an input button 100 applied to the portable terminal case 10 according to the present invention will be described with reference to FIG. 5. The input button 100 applied to the portable terminal case 10 according to the present invention mainly includes a base member 180, a push button 120, a sensor part 130, and a contact point 140. The base member 180 includes a bottom surface 181 and a protrusion 182 protruding upward from a central portion of the bottom surface 181. The push button 120 is disposed above the protrusion 182, and a downward sidewall 121 is formed in a downward direction to surround an outer surface of the protrusion 182.

In addition, as illustrated in FIG. 5, the sensor part 130 is formed on an outer side surface of the protrusion 182, and the contact point 140 may be formed in a region of an inner side surface of the downward sidewall 121 corresponding to a portion of the outer side surface of the protrusion 182 in which the sensor part 130 is disposed. Conversely, the sensor part 130 may be formed on the inner side surface of the downward sidewall 121, and the contact point 140 may be formed in a region of the outer side surface of the protrusion 182 corresponding to a portion on the inner side surface of the downward sidewall 121 in which the sensor part 130 is disposed.

In the above-described structure, when the push button 120 is laterally moved, the sensor part 130 comes into contact with the contact point 140 to generate a signal, and, specifically, the push button 120 is formed to laterally move laterally a predetermined distance in forward, rearward, leftward, and rightward directions but not to vertically move, the contact point 140 comes into contact with the sensor part 130 positioned in the direction in which the push button 120 is moved when a user laterally pushes the push button 120, and thus an input signal related to a corresponding sensor among a plurality of sensors formed in the sensor part 130 is generated. Accordingly, the push button 120 has to be formed to move in the forward, rearward, leftward, and rightward directions but not to rotate because, in the case in which the push button 120 is rotatable, the contact point may not come into contact with a corresponding sensor desired by the user, and thus an undesired input signal may be generated.

Meanwhile, a touch sensor of a tactile sensor may be used for the sensor part 130, and it is preferable for the sensor part 130 to be formed with a FPCB in consideration of a reduction of manufacturing costs, reduction in weight of a product, and the like. That is, at least one sensor is disposed on the FPCB, the sensor is formed as a terminal switch including a positive electrode and a negative electrode, the contact point 140 is formed of a conductive material, both the positive electrode and the negative electrode of the terminal switch come into contact with the contact point 140 when the push button 120 is laterally moved, and thus the positive electrode and the negative electrode are shorted to generate an input signal. In the terminal switch, specifically, the positive electrode and the negative electrode may be disposed in parallel to be spaced apart. In addition, the terminal switch may also be formed to have a portion in which the positive electrode and the negative electrode are horizontally and alternately arranged, that is, to have vertical irregularity patterns and irregular portions disposed to be alternately engaged with each other, and to maintain a state in which the irregular portions of the positive electrode and the negative electrode are slightly spaced apart. Here, the contact point 140 may also be formed such that only a contact portion protrudes for a definite shortage between the positive electrode and the negative electrode.

In addition, the input button 100 may further include the elastic member 160 for returning the push button 120 to an initial position thereof after the push button 120 is laterally moved, and it is preferable for an elastic material, such as a carbon sponge or silicone, to be applied to the elastic member 160, wherein the elastic material is compressed when the push button 120 is laterally moved and applies a restoring elastic force to the push button 120.

Hereinafter, how a portable terminal is controlled using specific signals by the input button 100 applied to the above-described portable terminal case 10 according to the present invention will be described.

First, when the push button 120 is laterally pushed, a mouse pointing signal or a direction key signal is generated. That is, the mouse pointing signal or the direction key signal is generated when the sensor part 130 and the contact point 140 come into contact with each other due to a lateral movement of the push button 120, and thus a mouse pointer displayed on a display of a cellular phone terminal controlled by the input button 100 may be moved or a selection of a plurality of application icons arranged and disposed on the display may be controlled. In addition, when the press button 150 is pressed, a click signal is generated. In this case, the mouse pointer displayed on the display of the portable terminal is positioned on an icon displayed in the display due to an operation of the push button 120, and when the press button 150 is pressed, an application corresponding to the icon may be executed like when the corresponding icon is touched.

In addition, when the push button 120 is pushed while the press button 150 is being pressed, a scroll signal or a drag signal is generated. A screen may be vertically moved by the scroll signal like when a finger moves from an upper side to a lower side or from the lower side to the upper side on the touch screen of the portable terminal. In addition, the screen may also be laterally moved as a whole by the drag signal like when a finger moves from a left side to a right side or from the right side to the left side on the touch screen of the portable terminal.

Meanwhile, when the push button 120 is pushed while the press button 150 is being pressed, a user has to simultaneously apply a pressure to the input button 100 in downward and lateral directions, and thus the user feels fatigue when the scroll and drag signals are generated using such a control method for long time. To solve such a problem, when a predetermined time passes after the scroll signal or the drag signal is generated by pushing the push button 120 while the press button 150 is being pressed, the generation of the scroll signal or the drag signal does not stop but is maintained even when the press button 150 and the push button 120 are released. Then, when the push button 120 is pushed again, the scroll signal or the drag signal may be generated according to a corresponding direction. In this case, since the scroll signal or the drag signal may be generated even without pushing the press button 150, a degree of fatigue of the user may be reduced. However, in the case in which it is necessary for the generation of scroll signal or the drag signal to stop, it is preferable for the generation of the scroll signal or the drag signal to be stopped when the press button 150 is pressed and released after the scroll signal or the drag signal is continuously generated.

Meanwhile, the click signal may be generated when the press button 150 is pressed for a time less than a predetermined time, and the scroll or drag signal may be generated when the press button 150 is pressed for the predetermined time or more.

Hereinafter, various embodiments of the portable terminal case 10 according to the present invention will be described with reference to FIGS. 6 to 11. FIGS. 6 to 11 are views illustrating the various embodiments of the portable terminal case according to the present invention.

Figure 6:
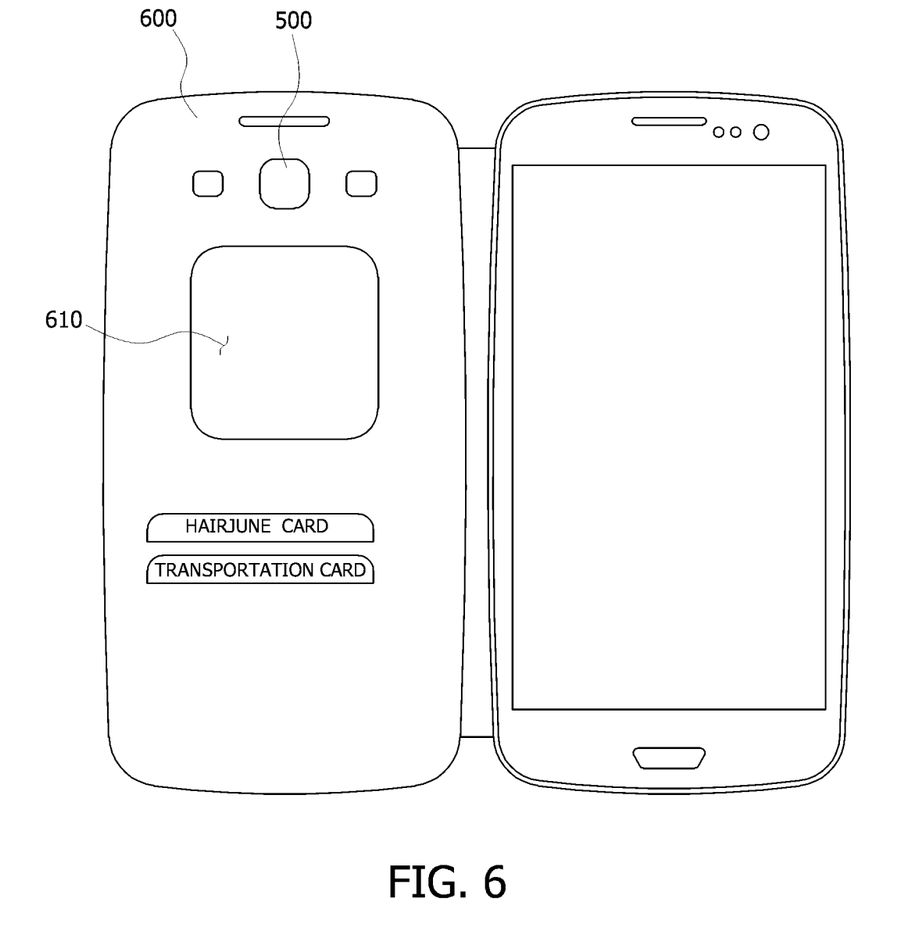
FIGS. 6 to 11 are views illustrating various embodiments of the portable terminal case according to the present invention.
Figure 7:
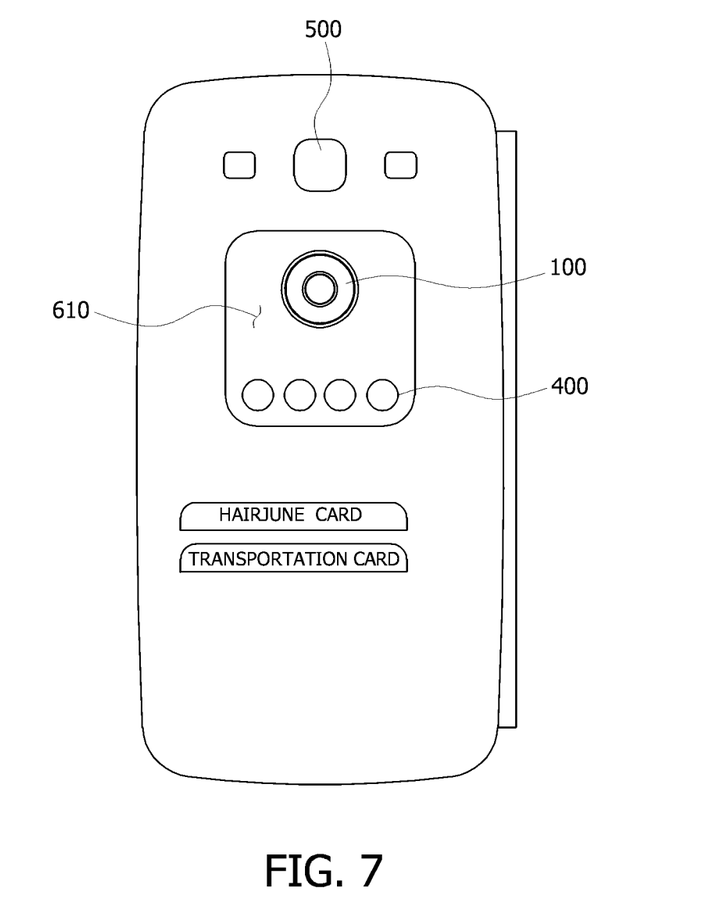

First, as illustrated in FIGS. 6 and 7, the portable terminal case 10 according to the present invention may further include a cover part 600 formed to extend from one side surface of the portable terminal case and configured to cover a display part of a portable terminal. The cover part 600 is generally pivoted backward to see a front surface of the display part. Here, in the case in which the input button 100 is disposed in a region in the portable terminal case 10 corresponding to a rear surface of the portable terminal, since the input button 100 is covered by the cover part 600, there is a problem in that the input button 100 may not be used. To prevent such a problem, as illustrated in FIGS. 6 and 7, an open region 610 is formed in one part of the cover part 600, and the open region 610 has to be formed such that the input button 100 is exposed to the outside when the cover part 600 is pivoted backward and disposed on the rear surface of the portable terminal. In addition, it is preferable for the open region 610 to be formed such that the button part 400 is also exposed to the outside.

Figure 8:
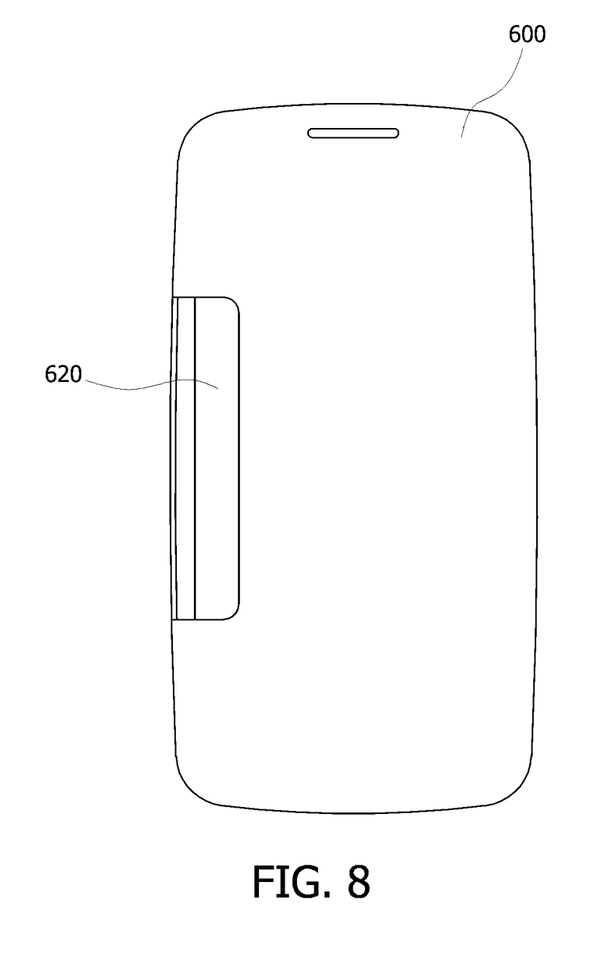
Figure 9:
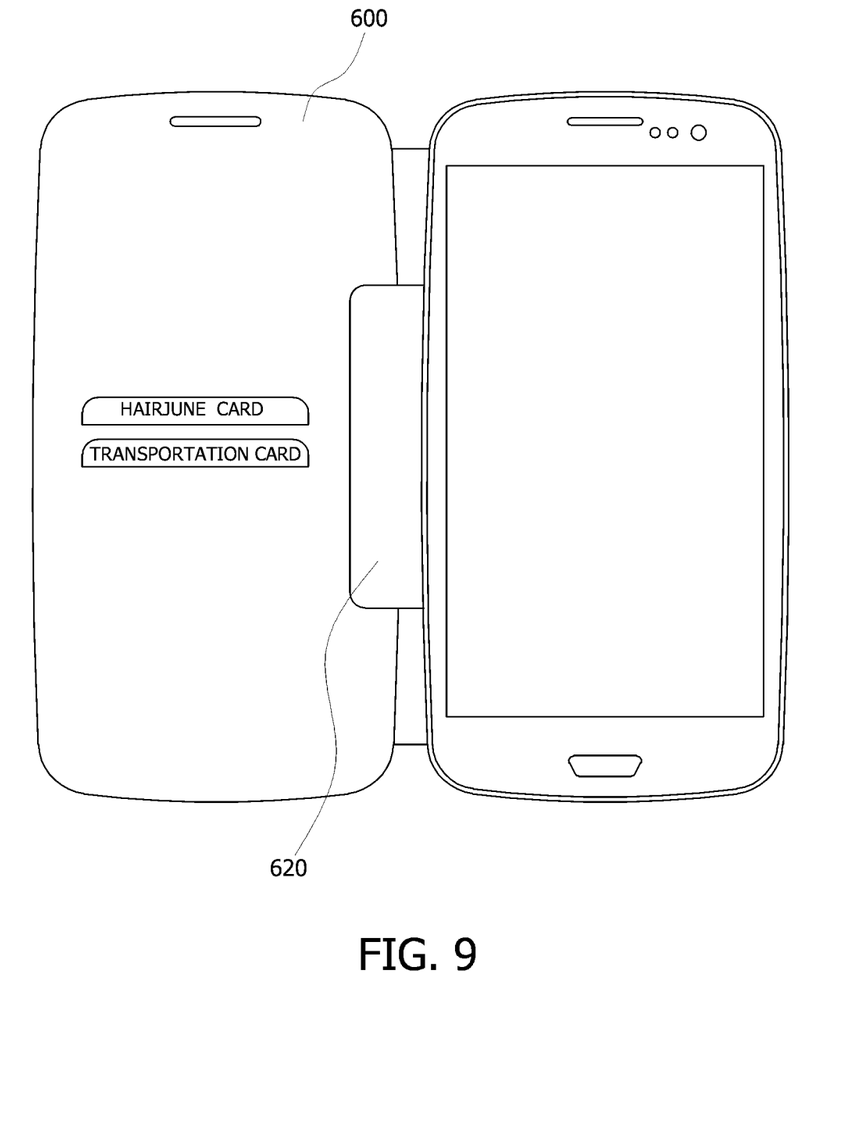

In addition, as illustrated in FIGS. 8 and 9, an open portion 620 may be formed in one part of a contact portion of the cover part 600 and a side surface of a portable terminal. In this case, as illustrated in FIG. 9, the open portion 620 is formed between the cover part 600 and a portion of the portable terminal cover configured to accommodate the portable terminal in a state in which the cover part 600 is not completely pivoted backward, and a user may insert a part of a user's finger into the open portion 620 to simultaneously support the portable terminal case 10 and operate the input button 100.

Figure 10:
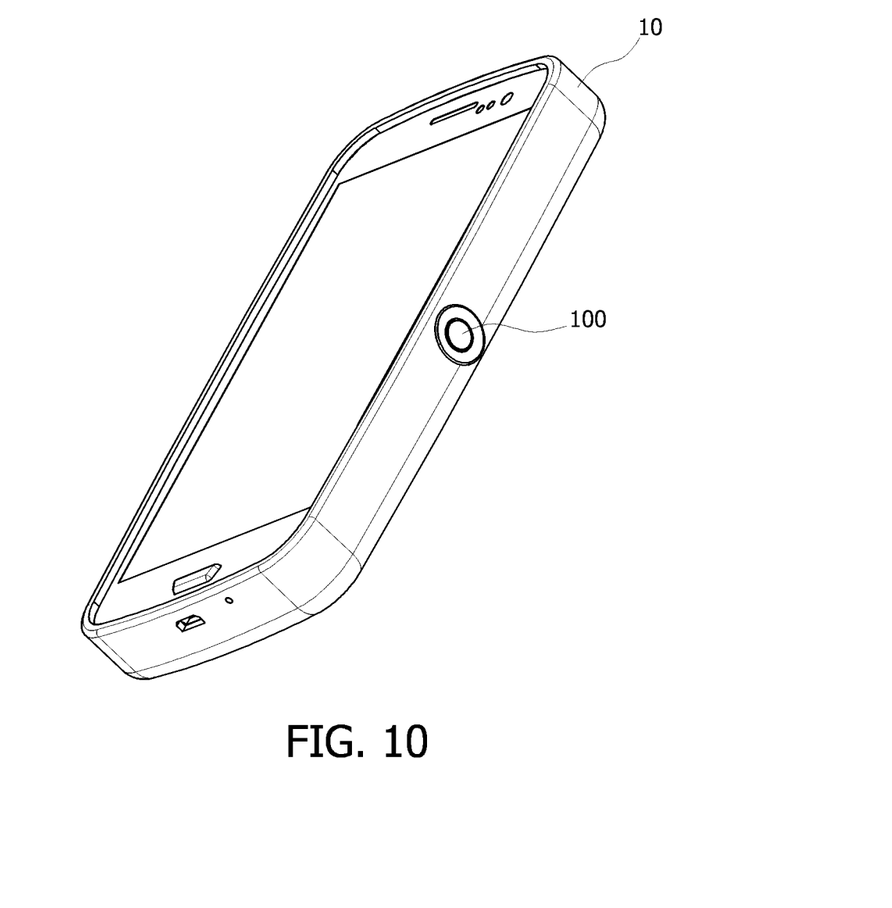
Figure 11:
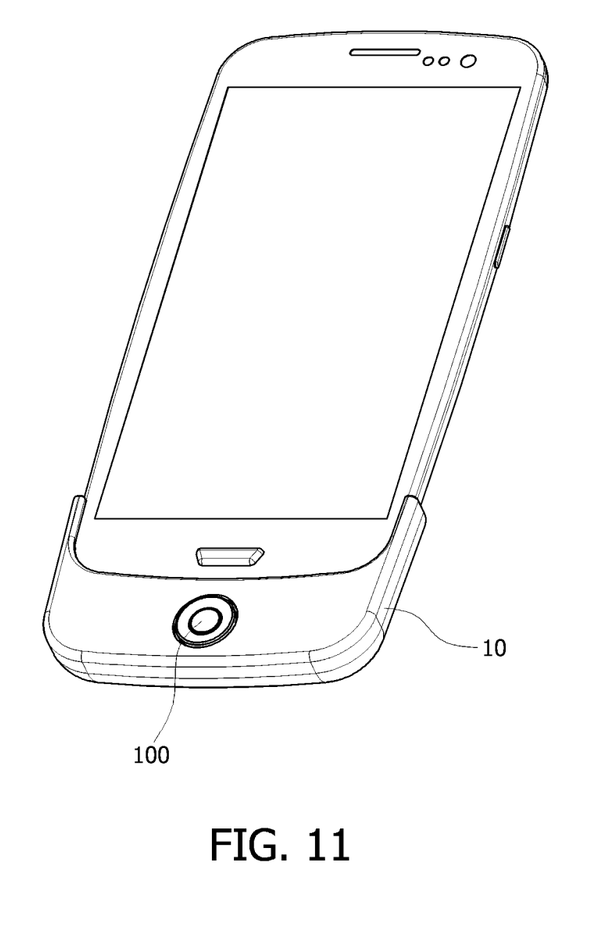

As described above, in the portable terminal case 10 according to the present invention, although the input button 100 may be disposed in the region in the portable terminal case 10 corresponding to the rear surface of the portable terminal, the input button 100 may also be disposed at a region in the portable terminal case 10 corresponding to a side surface of the portable terminal, as illustrated in FIG. 10. In this case, it is preferable for the button part 400 to be disposed in the region corresponding to the side surface of the portable terminal. In addition, in the portable terminal case 10 according to the present invention, the input button 100 may be disposed in a region in the portable terminal case 10 corresponding to a lower side of a front surface of the portable terminal, as illustrated in FIG. 11.

In addition, the portable terminal case according to the present invention may include a first case configured to directly accommodate a portable terminal, a second case configured to accommodate the first case or coupled to the first case, and the input button 100 mounted on the second case. That is, in a case in which a user already uses the first case, which is a case configured to directly accommodate the portable terminal, the portable terminal may be efficiently used by using the second case attached to the first case or including the input button 100 without intentionally changing the first case in use.

While the present invention has been described in detail with reference to the exemplary embodiments, the scope of the present invention is not limited to the specific embodiments and should be interpreted by the appended claims. In addition, those skilled in the art should understand that various modifications and changes may be made without departing the scope of the present invention.

The invention claimed is:

1. A portable terminal case mounted on a portable terminal, the portable terminal case comprising:
   an input button placed in the portable terminal case;
   a sensor generating an input signal of the portable terminal when the input button is moved; and
   a controller configured to control a function of processing the input signal generated according to an operation of the input button and having a communication part for wireless communication between the portable terminal and the input button.

2. The portable terminal case of claim 1, wherein the input button includes:
   a housing having an inner space;
   a push button seated in the inner space;
   a contact point formed on the other surface of the outer side surface of the push button and the inner side surface of the housing, and
   wherein, the sensor is formed on one surface of an outer side surface of the push button and an inner side surface of the housing, and
   wherein, when the push button is moved in a lateral direction, the sensor and the contact point come into contact with each other and the input signal of the portable terminal is generated.

3. The portable terminal case of claim 1, wherein the input button includes:
   a base member including a bottom surface and a protrusion protruding upward from the bottom surface;
   a push button located above the protrusion and including a downward sidewall formed to surround the protrusion;
   a contact point formed on the other surface of the outer side surface of the protrusion and the inner side surface of the downward sidewall, and
   wherein, the sensor formed on one surface of an outer side surface of the protrusion and an inner side surface of the downward sidewall, and
   wherein, when the push button is moved in a lateral direction, the sensor and the contact point come into contact with each other and the input signal of the portable terminal is generated.

4. The portable terminal case of claim 2, wherein a press button is disposed on an upper surface of the push button.

5. The portable terminal case of claim 4, wherein:
   a mouse pointing signal or a direction key signal is generated when the push button is pushed in the lateral direction;
   a click signal is generated when the press button is pressed; and
   a scroll signal or a drag signal is generated when the push button is pushed while the press button is being pressed.

6. The portable terminal case of claim 5, wherein, when a predetermined time has elapsed after the push button is pushed while the press button is being pressed and the push button is pushed again after the press button and the push button are released, generation of the scroll signal or the drag signal continues and does not stop.

7. The portable terminal case of claim 6, wherein, when the press button is pressed and released after the scroll signal or the drag signal is continuously generated, the generation of the scroll signal or the drag signal stops.

8. The portable terminal case of claim 4, wherein:
   a click signal is generated when the press button is pressed for a time less than a predetermined time; and
   a scroll or drag signal is generated when the press button is pressed for a time greater than or equal to the predetermined time.

9. The portable terminal case of claim 1, further comprising:
   a battery configured to supply power to at least one of the input button and the controller.

10. The portable terminal case of claim 1, further comprising a cover part formed to extend from one side surface of the portable terminal case and formed to cover a display part of the portable terminal.

11. The portable terminal case of claim 1, wherein the input button is disposed in a region in the portable terminal case corresponding to a rear surface of the portable terminal.

12. The portable terminal case of claim 1, wherein the input button is disposed in a region in the portable terminal case corresponding to a side surface of the portable terminal.

13. The portable terminal case of claim 1, further comprising a button part including at least one function button configured to perform a specific function of the portable terminal.

14. The portable terminal case of claim 13, wherein the button part is disposed in a region in the portable terminal case corresponding to a rear surface of the portable terminal.

15. The portable terminal case of claim 13, wherein the button part is disposed in a region in the portable terminal case corresponding to a side surface of the portable terminal.

16. The portable terminal case of claim 13, wherein the button part includes a home button or a back button.

17. The portable terminal case of claim 13, wherein the specific function of the function button is settable using an application installed in the portable terminal by a user.

18. The portable terminal case of claim 17, wherein the application is settable such that an additional control of the specific function performed by the function button is performed by the input button.

19. A portable terminal case comprising:
a first case configured to directly accommodate a portable terminal;
a second case configured to accommodate the first case or coupled to the first case; and
an input button mounted on the second case,
wherein the input button generates an input signal of the portable terminal.

\* \* \* \* \*